(12) United States Patent
Mellet et al.

(10) Patent No.: US 10,975,943 B2
(45) Date of Patent: Apr. 13, 2021

(54) TORQUE CONVERTER ASSEMBLY AND METHOD OF OPERATING THE SAME

(71) Applicant: GM GLOBAL TECHNOLOGY OPERATIONS LLC, Detroit, MI (US)

(72) Inventors: Edward W. Mellet, Rochester Hills, MI (US); Leonid Basin, Farmington Hills, MI (US); Victor M. Roses, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 115 days.

(21) Appl. No.: 16/243,544

(22) Filed: Jan. 9, 2019

(65) Prior Publication Data
US 2020/0217404 A1 Jul. 9, 2020

(51) Int. Cl.
*F16H 45/02* (2006.01)
*F16D 25/0638* (2006.01)

(52) U.S. Cl.
CPC ......... *F16H 45/02* (2013.01); *F16D 25/0638* (2013.01); *F16H 2045/0284* (2013.01)

(58) Field of Classification Search
CPC ......... F16D 25/0638; F16D 2045/0284; F16D 45/02
See application file for complete search history.

(56) References Cited

U.S. PATENT DOCUMENTS

| | | |
|---|---|---|
| 4,051,932 A | 10/1977 | Arai et al. |
| 4,199,047 A | 4/1980 | Ling |
| 5,058,716 A | 10/1991 | Lippe et al. |
| 5,407,041 A | 4/1995 | Fukunaga et al. |
| 6,343,679 B1 | 2/2002 | Kundermann |
| 6,837,348 B2 | 1/2005 | Breier et al. |
| 6,915,886 B2 | 7/2005 | Dacho et al. |
| 7,143,879 B2 | 10/2006 | Ackermann et al. |
| 7,621,385 B2 | 11/2009 | Samie et al. |
| 2007/0235277 A1* | 10/2007 | Heuler ............... F16D 25/0638 192/3.3 |
| 2017/0211674 A1* | 7/2017 | Goleski ................. F16D 25/10 |
| 2018/0363749 A1* | 12/2018 | Cai ...................... F16F 15/123 |

FOREIGN PATENT DOCUMENTS

JP 2-62473 3/1990

* cited by examiner

*Primary Examiner* — Stacey A Fluhart

(57) ABSTRACT

A torque converter assembly configured to be connected between an engine and a transmission in a vehicle. The torque converter assembly comprises a cover plate, a pump, a turbine, a stator, and a clutch assembly operably connected between the cover plate and the turbine. The clutch assembly comprises a coverside plate, a turbine-side plate, and a piston located at least partially between the coverside plate and the turbine-side plate. A charge circuit is configured at least partially between the cover plate and the coverside plate, a compensation circuit is configured at least partially between the coverside plate and the piston, and an apply circuit is configured at least partially between the piston and the turbine-side plate.

13 Claims, 3 Drawing Sheets

TORQUE CONVERTER ASSEMBLY AND METHOD OF OPERATING THE SAME

INTRODUCTION

The field of technology generally relates to vehicle torque converter assemblies, more particularly, to torque converter clutches and their method of operation.

The torque converter is a hydrodynamic device positioned between the engine and transmission of a vehicle. The torque converter assembly provides a fluid coupling that can be used to manipulate and transmit power from the engine to the various components of the vehicle transmission such as the driveshaft, differential, and wheels. A torque converter clutch, also known as a lockup clutch, mechanically links the engine and transmission when actuated, bypassing various components of the torque converter to transmit power directly from the engine to the transmission. A two-path fluid control arrangement for a torque converter clutch can be simpler and less expensive to manufacture than other fluid control arrangements, such as three- or four-path implementations.

SUMMARY

According to one embodiment, there is provided a torque converter assembly configured to be connected between an engine and a transmission in a vehicle. The torque converter assembly comprises a cover plate; a pump having a plurality of impeller blades; a turbine having a plurality of turbine blades; a stator having a plurality of stator vanes disposed at least partially between the pump and the turbine; and a clutch assembly operably connected between the cover plate and the turbine. The clutch assembly comprises a coverside plate, a turbine-side plate, and a piston located at least partially between the coverside plate and the turbine-side plate. A charge circuit is configured at least partially between the cover plate and the coverside plate, a compensation circuit is configured at least partially between the coverside plate and the piston, and an apply circuit is configured at least partially between the piston and the turbine-side plate.

According to various embodiments, this assembly may further include any one of the following steps or features or any technically-feasible combination of these steps or features: the apply circuit and the charge circuit have a shared charge and apply inlet portion; the shared charge and apply inlet portion splits into the apply circuit and the apply circuit is configured to feed into the charge circuit; the clutch assembly includes a bidirectional seal between the turbine-side plate and the piston; the bidirectional seal is configured to allow for an increased flow volume from the charge circuit into the apply circuit as compared to a flow volume from the apply circuit into the charge circuit; the clutch assembly includes a bias member between the coverside plate and the piston, the bias member being configured to bias the clutch assembly into a disengaged position; the piston includes a backside and an apply side, and the charge circuit is configured to be isolated from the backside of the piston; the clutch assembly includes a multi-plate clutch pack; and/or the piston actuates the multi-plate clutch pack and causes multiple plates of the multi-plate clutch pack to come into direct contact.

According to another embodiment, there is provided a torque converter assembly configured to be connected between an engine and a transmission in a vehicle. The torque converter assembly comprises a cover plate; a pump having a plurality of impeller blades; a turbine having a plurality of turbine blades; a stator having a plurality of stator vanes disposed at least partially between the pump and the turbine; a clutch assembly operably connected between the cover plate and the turbine, the clutch assembly comprising a coverside plate, a turbine-side plate, a bias member, and a piston located at least partially between the bias member and the turbine-side plate. The piston includes a backside and an apply side, and the bias member is configured to bias the backside of the piston away from the coverside plate into a disengaged position.

According to various embodiments, this assembly may further include any one of the following steps or features or any technically-feasible combination of these steps or features: the bias member is a wave spring or leaf spring; the bias member is situated in a balancing cavity formed between the backside of the piston and the coverside plate; a charge circuit is configured at least partially between the cover plate and the coverside plate, a compensation circuit is configured at least partially in the balancing cavity, and an apply circuit is configured at least partially between the apply side of the piston and the turbine-side plate; and/or a spring force of the bias member is configured to overcome a start-up pressure in the apply circuit.

According to yet another embodiment, there is provided a method of operating a torque converter assembly for a vehicle comprising the steps of directing fluid from a sump into a shared charge and apply inlet portion; directing the fluid from the shared charge and apply inlet portion into an apply circuit; directing the fluid from the apply circuit to a charge circuit; separately directing balancing fluid from a compensation inlet portion to a compensation circuit; and circulating fluid from the charge circuit and the apply circuit back to the sump.

According to various embodiments, this method may further include any one of the following steps or features or any technically-feasible combination of these steps or features: the balancing fluid is supplied through a separate oil feed from the shared charge and apply inlet portion; reversing a flow direction of the fluid so that the fluid flows from the charge circuit and the apply circuit out of the shared charge and apply inlet portion; and/or a bidirectional seal is provided at least partially between the apply circuit and the charge circuit to promote an increased flow volume of fluid between the charge circuit and the apply circuit when the fluid flows from the charge circuit and the apply circuit out of the shared charge and apply inlet portion.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION

The torque converter assemblies and operating methods described herein can advantageously provide for more controllable fluid performance and clutch responsiveness. The torque converter clutch separates the high converter charge pressure from the piston apply pressure, modifying a two-path arrangement such that it can achieve three-path functionality without the expense or complexity of a third controlled fluid path. Accordingly, embodiments of the torque converter assemblies and operating methods disclosed herein can achieve simpler, less expensive routing of fluid. In at least some implementations, this is accomplished by orienting the piston of the clutch assembly such that the converter charge pressure acts first to apply the torque converter clutch, then flow through the converter. Additionally, a compensation or balancing fluid circuit is provided to separate the apply circuit and the charge circuit, thereby lowering a backside pressure against that the clutch piston.

Figure 1:
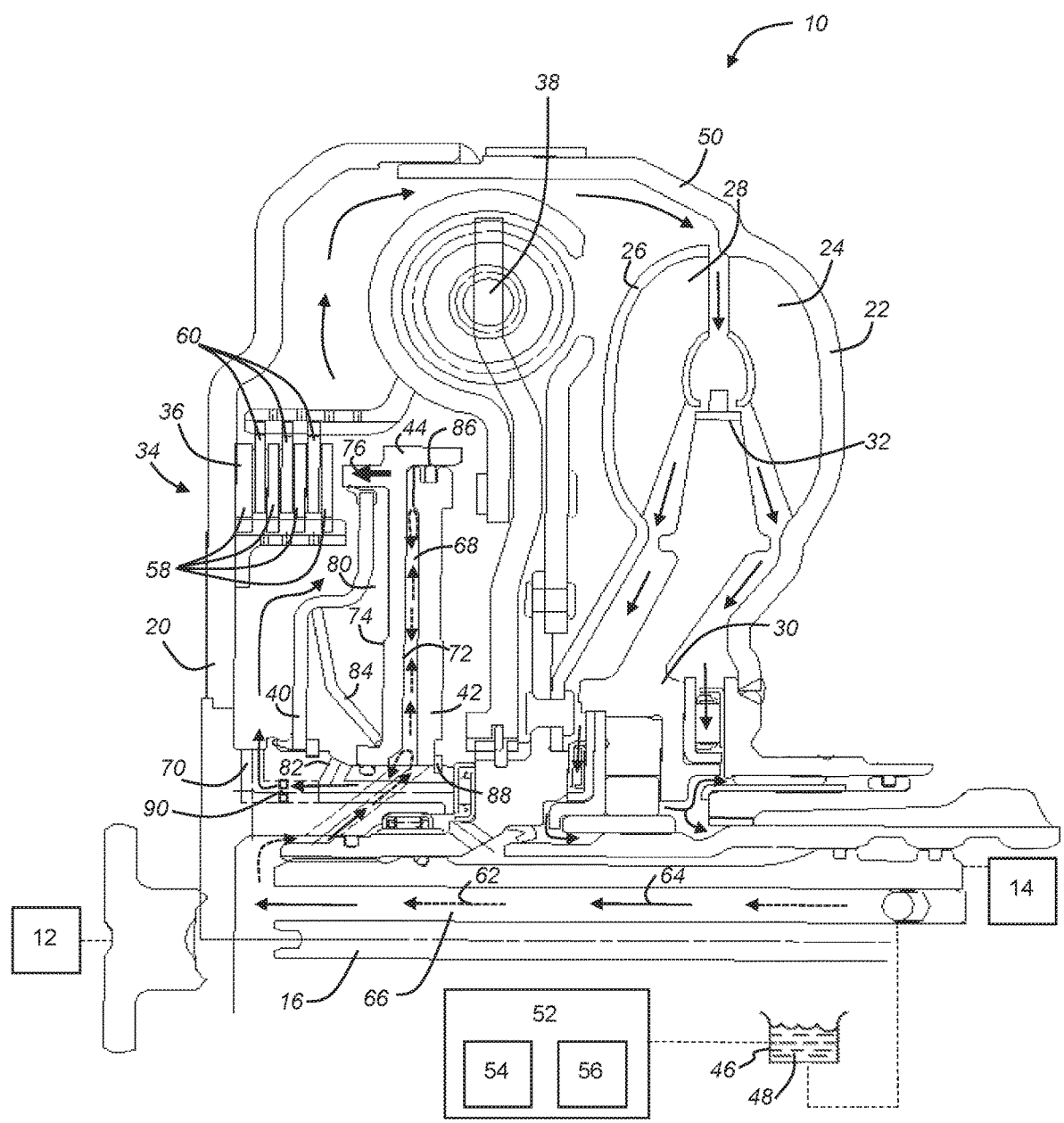
FIG. 1 is a partial, schematic, cross-section view of a torque converter assembly, illustrating a fluid flow circuit in accordance with one embodiment.

FIG. 1 schematically illustrates a torque converter assembly 10 connected between an engine 12 and a transmission 14 of a vehicle. Fluid transfers through a shaft 16, which may be a single turbine shaft, into the main body of the torque converter assembly 10. The torque converter assembly 10 includes a cover plate 20, a pump 22 having a plurality of impeller blades 24, a turbine 26 having a plurality of turbine blades 28, and a stator 30 having a plurality of stator vanes 32 disposed at least partially between the pump and the turbine. A clutch assembly 34 is operably connected between the cover plate 20 and the turbine 26. The clutch assembly 34 includes a multi-plate clutch pack 36 and a damper plate 38, as well as a coverside plate 40, a turbine-side plate 42, and a piston 44 located at least partially between the coverside plate 40 and the turbine-side plate 42. The configuration of the clutch assembly 34 can advantageously provide for better responsiveness and controllability with less complex fluid routing schemes.

The engine 12 is an internal combustion engine, and can be a diesel or gasoline powered engine to cite two examples, although an alternate fuel source may be used. The engine 12 has one or more cylinders with a piston. The piston rotates the crankshaft via volumetric changes in the combustion chamber due to ignition and combustion of an air fuel mixture. The representation of engine 12, transmission 14, and torque assembly 10 is schematic, and accordingly, other features not illustrated may be provided, such as a flywheel, various gears, valves, seals, or shafts, etc. Additionally, in some embodiments, the vehicle employing the torque converter assembly 10 may be a hybrid vehicle such that the internal combustion engine 12 is not the only source of motive power, and one or more motor/generators are used to supplement the engine 12. In yet another embodiment, the engine 12 may be an electric engine or any other type of prime mover that generally supplies driving torque to the transmission 14 via the crankshaft.

The transmission 14 outputs driving torque from the engine 12 via the torque converter assembly 10 and the transmission shaft. The transmission 14 may be a front-wheel drive transmission, a rear-wheel drive transmission, an all-wheel drive transmission, etc., that controllably distributes torque to the various components of the vehicle. In some embodiments, the transmission 14 includes a gearbox including various gear sets, shafts, and clutches and/or brakes to selectively transmit power to other various components such as a driveshaft and wheels of the vehicle.

The torque converter assembly 10 provides a fluid coupling that can be used to manipulate and transmit power from the engine 12 to the transmission 14 and its various components. An oil pan or sump 46 is configured to provide fluid 48, such as transmission oil or automatic transmission fluid (ATF), to the torque converter assembly 10. The fluid is generally contained within a pump housing 50 of the pump 22 and the cover plate 20, which are attached to each other so that the pump 22 is driven when the engine 12 drives the cover plate 20. A plurality of impeller blades 24 connected to and circumferentially spaced around the inside of the pump 22 direct the transmission oil 48 toroidally outward toward the turbine 26. With sufficient force, the turbine blades 28 rotate with the impeller blades 24. Fluid exiting the turbine 26 via the turbine blades 28 impacts stator vanes 32 of the stator 30. The stator 30 redirects fluid flow from the turbine 26 to the pump 22 in the same direction as the rotation of the impeller blades 24, thereby reducing pump torque and causing torque multiplication.

Various aspects of fluid control, engagement or disengagement of the clutch assembly 34, etc., may be accomplished via a controller 52, which could be a dedicated torque converter controller, a transmission or powertrain controller, etc. The controller 52 may be considered an electronic control unit (ECU), a control module, etc., and may include any variety of electronic processing devices, memory devices, input/output (I/O) devices, and/or other known components, and may perform various control and/or communication related functions. In an example embodiment, controller 52 includes an electronic memory device 54 that stores sensor readings, look up tables or other data structures, algorithms (e.g., one or more algorithms embodied in the method described below), etc. The memory device 54, or just a portion thereof, can be implemented or maintained in the form of an electronic data structure, as is understood in the art. The controller 52 also includes an electronic processing device 56 (e.g., a microprocessor, a microcontroller, an application specific integrated circuit (ASIC), etc.) that executes instructions for software, firmware, programs, algorithms, scripts, etc. that are stored in memory device 54 and may partially govern the processes and methods described herein.

Hydrodynamic coupling between the pump 22 and the turbine 26 can be bypassed by engaging or actuating the clutch assembly 34. In the illustrated embodiment, when the clutch assembly 34 is engaged, multiple plates 58, 60 of the multi-plate clutch pack 36, which are lined with a friction material, come into direct contact with an apply force that is sufficient to prevent relative rotation or "slip" under normal operating conditions. Since the first plurality of clutch plates 58 are secured to the cover plate 20, and the second plurality of clutch plates 60 are mounted to the damper plate 38 and turbine 26, engagement of the clutch assembly 34 serves to mechanically couple the pump 22 and the turbine 26 so that they rotate together. Thus, engine torque is transferable to the transmission 14 without efficiency losses associated with the operation of the fluid 48. The clutch assembly 34 may also be partially engaged such that the clutch plates 58, 60 are brought into engagement with a reduced apply force such that the clutch plates 58, 60 can slip in a controllable manner. Aspects of the present disclosure may also be applicable to other clutch plate configurations, but in an advantageous embodiment, the multi-plate clutch pack is used to allow for improved tunability and control.

Figure 3:
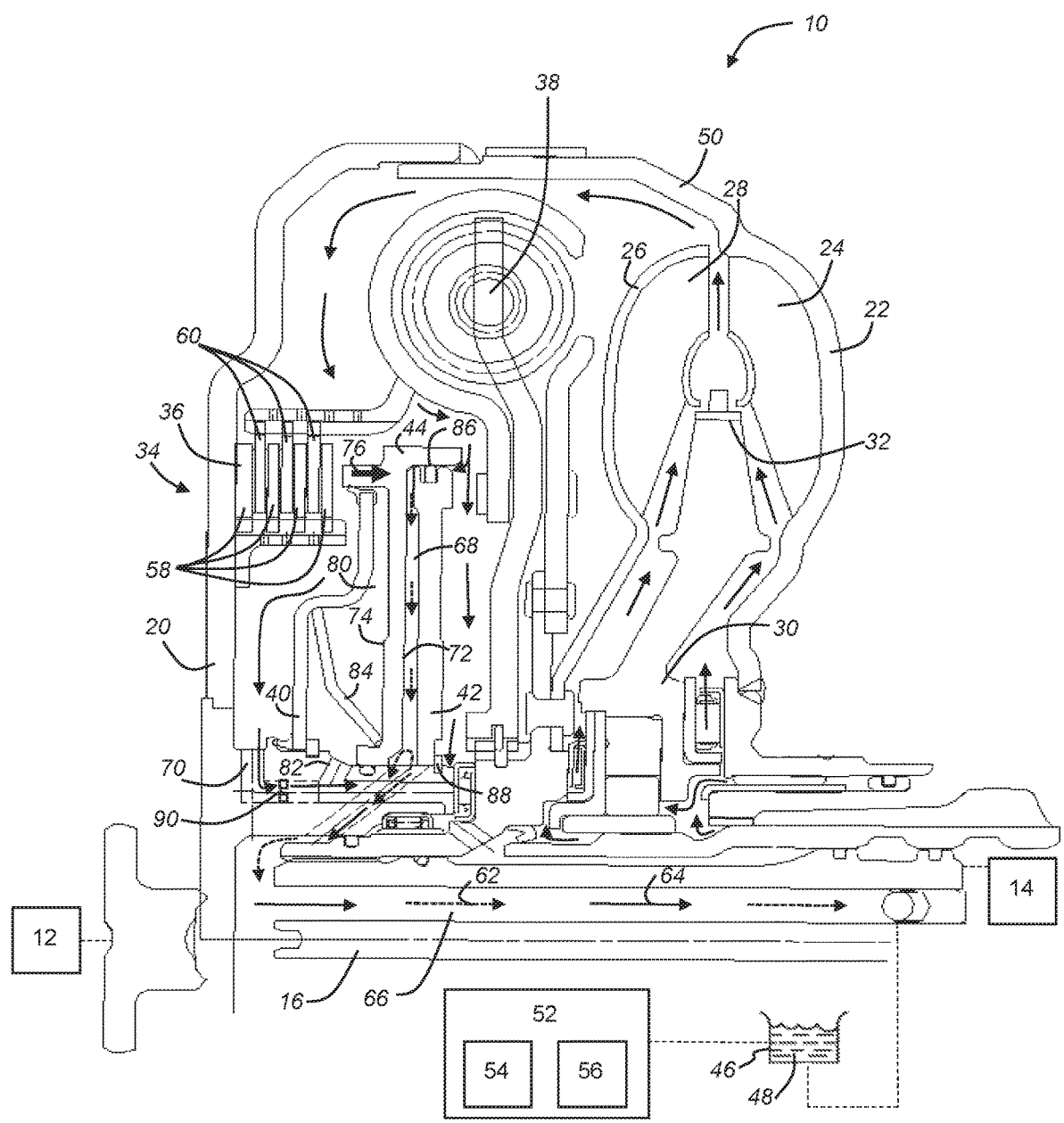
FIG. 3 is a partial, schematic, cross-section view of the torque converter assembly of FIGS. 1 and 2, illustrating a fluid flow circuit in accordance with another embodiment.

The arrows in FIG. 1 schematically illustrate various fluid flow circuits that may be used during operation of the torque converter assembly 10 and clutch assembly 34. In FIGS. 1 and 3, the dotted line arrows represent the apply circuit 62 which is used to actuate piston 44 and engage the clutch assembly 34. Also in FIGS. 1 and 3, the solid line arrows represent the charge circuit 64 which is the primary fluid flow path through the toroidal volume of the assembly 10. Fluid 48 is pumped from the sump 46 into a shared charge and apply inlet portion 66. The apply circuit 62 and the charge circuit 64 overlap in the shared charge and apply inlet portion 66. In some embodiments, fluid 48 is fed first into an apply cavity 68 and then into a charge inlet portion 70 such that the apply circuit 62 entirely overlaps with the charge circuit 64. In this embodiment, the shared charge and apply inlet portion 66 splits into the apply circuit 62 and the apply circuit is then configured to feed into the charge circuit 64. This may be accomplished using separate holes from the apply circuit 62 into the converter charge or charge inlet portion 70. Feeding the clutch apply fluid 48 into the charge circuit 64 can help cool the clutch assembly 34. Advantageously, the apply circuit 62 feeds into the charge circuit 64 to help increase the pressure in the shared charge and apply inlet portion 66, which serves to increase the pressure in the apply cavity 68 which then acts on the apply side 72 of the piston 44. When the pressure is greater on the apply side 72 of the piston 44, as compared to the backside 74 of the piston, the piston moves to cause direct contact between the plates 58, 60 of the clutch pack 36. The movement of piston 44 to engage the clutch assembly 34 in this embodiment (or disengage as shown in FIG. 3) is designated by arrow 76 at an actuating arm of the piston, which extends axially from a radially projecting body towards the multi-plate clutch pack 36.

Figure 2:
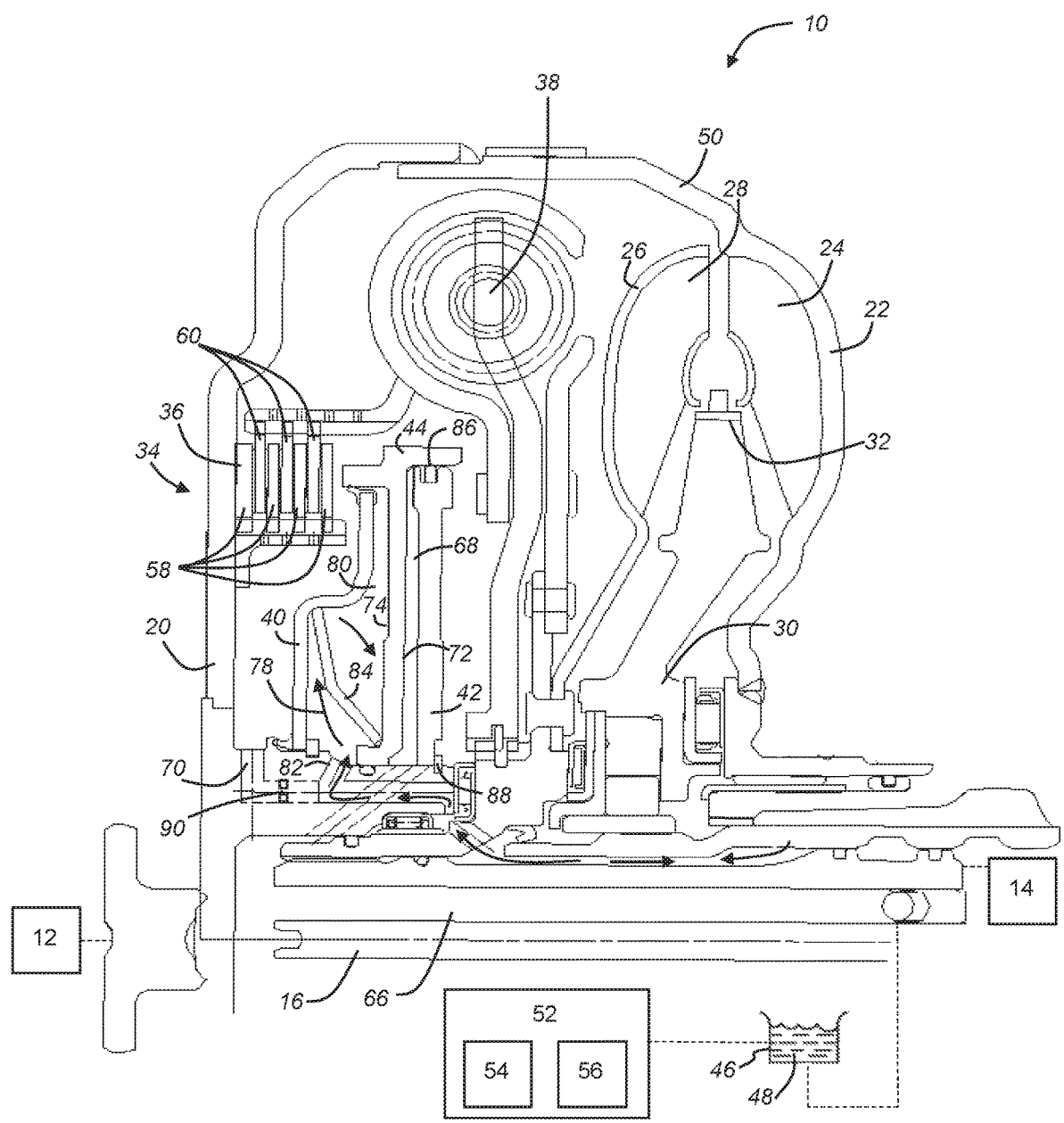
FIG. 2 is a partial, schematic, cross-section view of the torque converter assembly of FIG. 1, illustrating a fluid flow circuit in accordance with another embodiment.

With typical two-path arrangements, the overlap between the apply circuit 62 and the charge circuit 64 can result in high charge pressure in the charge circuit 62 that acts on the backside 74 of the piston 44, thereby creating higher required apply pressures for the clutch assembly 34. To address this, the torque converter assembly 10 includes a compensation circuit 78 which is designated with arrows in FIG. 2. The compensation circuit 78 includes a balancing cavity 80 that can be filled with a balancing oil through a compensation inlet portion 82, which may be separate from the fluid 48, or in some embodiments, the balancing oil is also pumped from the fluid 48 in the sump 46. The compensation circuit 78 and the balancing cavity 80 serve to at least partially separate the high converter charge pressure (charge circuit 64) from the piston apply pressure (apply circuit 62). The compensation circuit 78 helps to rotationally balance the piston 44 so that converter charge pressure on the backside 74 of the piston 44 has less (or no) impact on the piston 44 and/or apply circuit 62. Accordingly, in the illustrated embodiments, the charge circuit 64 is located at least partially between the cover plate 20 and the coverside plate 40; the compensation circuit 78 is located at least partially between the coverside plate 40 and the backside 74 of the piston 44; and the apply circuit 62 is located at least partially between the apply side 72 of the piston 44 and the turbine-side plate 42. The overlap between the apply circuit 62 and the charge circuit 64, by feeding the charge fluid 48 into the apply cavity 68, can be more easily accomplished by the configuration illustrated in the figures, where the balancing pressure separates the charge and apply pressures. After flowing through the charge circuit 64, the fluid 48 from both the charge circuit 64 and the apply circuit 62 is circulated back to the sump 46. An advantage of the present assembly 10, as opposed to typical three-path arrangements, is that the balancing fluid can be brought forward without new routings through the cover plate 20, the case, and/or the valve body/solenoid body.

Returning to FIG. 1, during unidirectional operation of the torque converter assembly 10, the pressures in the various circuits 62, 64, 78 can be controlled to facilitate engagement or disengagement of the clutch assembly 34. A bias member 84 can be included in the balancing cavity 80 between the backside 74 of the piston 44 and the coverside plate 40. The bias member 84 is advantageously a wave spring or a leaf spring, but other types and configurations for the bias member are certainly possible, such as using straps or different spring types, to cite a few examples. The bias member 84 can be used to bias the piston 44 or clutch assembly 34 into a disengaged position. With unidirectional operation, there can be improved controllability, but the spring force of the bias member 84 should be set to overcome potential start-up pressure in the apply circuit 62 or apply cavity 68 before the converter assembly 10 is pressurized. In such an embodiment, it may be advantageous to set the apply pressure higher than the initial charge pressure. Then, with unidirectional flow, once pressurized, the pressure in the shared charge and apply inlet portion 66 can be increased or decreased depending on whether the clutch assembly 34 should be engaged or disengaged.

The torque converter assembly 10 may also be operated in accordance with a bidirectional flow pattern. FIG. 1 illustrates a clockwise flow engagement pattern, which may be used to engage the clutch assembly 34, whereas FIG. 3 illustrates a counterclockwise flow disengagement pattern, which may be used to disengage the clutch assembly. As opposed to the illustration of FIG. 1, the flow direction in FIG. 3 is reversed so that fluid flows from the apply circuit 62 and the charge circuit 64 out of the shared charge and apply inlet portion 66, as designated by the arrows. The bidirectional flow pattern is similar to standard two-path controls, but includes improved balancing of the clutch piston 44. Because there is a higher open feed converter flow in the charge circuit 64, one or more bidirectional seals 86, 88 can be used to enable higher reversed flow in certain locations. Advantageously, the bidirectional seals 86, 88 encourage an increased flow volume of fluid 48 in the counterclockwise direction as compared to the clockwise direction.

The bidirectional seals 86, 88 can be adapted for compliance with the desired mounting location and configuration. The bidirectional seals 86, 88 may take a variety of forms, and will likely depend on the mounting location. For example, the bidirectional seals can be check balls or check valves, seal rings with one or more grooves, holes, etc. to promote increased flow volumes in one direction, or another seal type. In an advantageous embodiment, one or more bidirectional seals 86, 88 are similar to the annular seals described in U.S. application Ser. No. 15/802,768, assigned to the present Applicant and incorporated by reference herein in its entirety. The bidirectional seal 86 is located at a radially distal end of the turbine-side plate and interfaces with the piston 44 to control fluid flow within the apply cavity 68. The bidirectional seal 86 can promote increased fluid flow volumes out of the apply cavity 68 from the apply circuit 62 when the clutch 34 is to be disengaged. Bidirectional seal 88 may also be used at the outlet of the charge circuit, to selectively control fluid flow volumes within the charge circuit 64. A restricted orifice 90 may be provided at the charge inlet portion 70 to help control fluid flow at the inlet of the charge circuit 64. More or less bidirectional seals may be included than what is illustrated in the figures, and as mentioned, the seals may take a variety of forms and/or configurations depending on the mounting location and the desired fluid flow volumes to promote improved operational functionality.

It is to be understood that the foregoing description is not a definition of the invention, but is a description of one or more preferred exemplary embodiments of the invention. The invention is not limited to the particular embodiment(s)

disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

What is claimed is:

1. A torque converter assembly configured to be connected between an engine and a transmission in a vehicle, the torque converter assembly comprising:
   a cover plate;
   a pump having a plurality of impeller blades;
   a turbine having a plurality of turbine blades;
   a stator having a plurality of stator vanes disposed at least partially between the pump and the turbine; and
   a clutch assembly operably connected between the cover plate and the turbine, the clutch assembly comprising a coverside plate, a turbine-side plate, and a piston located at least partially between the coverside plate and the turbine-side plate, wherein a charge circuit is configured at least partially between the cover plate and the coverside plate, a compensation circuit is configured at least partially between the coverside plate and the piston, and an apply circuit is configured at least partially between the piston and the turbine-side plate, wherein the apply circuit and the charge circuit have a shared charge and apply inlet portion.

2. The torque converter assembly of claim 1, wherein the shared charge and apply inlet portion splits into the apply circuit and the apply circuit is configured to feed into the charge circuit.

3. The torque converter assembly of claim 1, wherein the clutch assembly includes a bidirectional seal between the turbine-side plate and the piston.

4. The torque converter assembly of claim 3, wherein the bidirectional seal is configured to allow for an increased flow volume from the charge circuit into the apply circuit as compared to a flow volume from the apply circuit into the charge circuit.

5. The torque converter assembly of claim 1, wherein the clutch assembly includes a bias member between the coverside plate and the piston, the bias member being configured to bias the clutch assembly into a disengaged position.

6. The torque converter assembly of claim 1, wherein the piston includes a backside and an apply side, and the charge circuit is configured to be isolated from the backside of the piston.

7. The torque converter assembly of claim 1, wherein the clutch assembly includes a multi-plate clutch pack.

8. The torque converter assembly of claim 7, wherein the piston actuates the multi-plate clutch pack and causes multiple plates of the multi-plate clutch pack to come into direct contact.

9. A method of operating a torque converter assembly connected between an engine and a transmission in a vehicle, the method comprising the steps of:
   providing the torque converter assembly having a cover plate, a pump having a plurality of impeller blades, a turbine having a plurality of turbine blades, a stator having a plurality of stator vanes disposed at least partially between the pump and the turbine, and a clutch assembly operably connected between the cover plate and the turbine, the clutch assembly comprising a coverside plate, a turbine-side plate, and a piston located at least partially between the coverside plate and the turbine-side plate, a charge circuit disposed at least partially between the cover plate and the coverside plate, a compensation circuit disposed at least partially between the coverside plate and the piston, and an apply circuit disposed at least partially between the piston and the turbine-side plate, wherein the apply circuit and the charge circuit have a shared charge and apply inlet portion;
   directing fluid from a sump into the shared charge and apply inlet portion;
   directing the fluid from the shared charge and apply inlet portion into the apply circuit;
   directing the fluid from the apply circuit to the charge circuit;
   separately directing balancing fluid from a compensation inlet portion to the compensation circuit; and
   circulating fluid from the charge circuit and the apply circuit back to the sump.

10. The method of claim 9, wherein the balancing fluid is supplied through a separate oil feed from the shared charge and apply inlet portion.

11. The method of claim 10, wherein a bidirectional seal is provided at least partially between the apply circuit and the charge circuit to promote an increased flow volume of fluid between the charge circuit and the apply circuit when the fluid flows from the charge circuit and the apply circuit out of the shared charge and apply inlet portion.

12. The method of claim 9, further comprising the step of reversing a flow direction of the fluid so that the fluid flows from the charge circuit and the apply circuit out of the shared charge and apply inlet portion.

13. A torque converter assembly configured to be connected between an engine and a transmission in a vehicle, the torque converter assembly comprising:
   a cover plate;
   a pump having a plurality of impeller blades;
   a turbine having a plurality of turbine blades;
   a stator having a plurality of stator vanes disposed at least partially between the pump and the turbine; and
   a clutch assembly operably connected between the cover plate and the turbine, the clutch assembly comprising a coverside plate, a turbine-side plate, and a piston located at least partially between the coverside plate and the turbine-side plate, wherein a charge circuit is configured at least partially between the cover plate and the coverside plate, a compensation circuit is configured at least partially between the coverside plate and the piston, and an apply circuit is configured at least partially between the piston and the turbine-side plate, wherein the clutch assembly includes a bidirectional seal between the turbine-side plate and the piston, and wherein the bidirectional seal is configured to allow for an increased flow volume from the charge circuit into the apply circuit as compared to a flow volume from the apply circuit into the charge circuit.

* * * * *